United States Patent [19]

Andresevitz

[11] Patent Number: 4,457,476

[45] Date of Patent: Jul. 3, 1984

[54] WINGLESS AIRCRAFT

[76] Inventor: Frank Andresevitz, c/o 5th Assembly of God, 16215, Oreszaba St., Paramount, Calif. 90723

[21] Appl. No.: 323,269

[22] Filed: Nov. 20, 1981

[51] Int. Cl.³ .............................................. B64C 29/00
[52] U.S. Cl. .................................. 244/23 C; 244/52; 244/56; 60/39.34
[58] Field of Search ................... 244/12.2, 236, 52, 66, 244/56, 12.4, 12.3, 23 A; 60/39.34, 39.35, 39.14 M

[56] References Cited

U.S. PATENT DOCUMENTS

| | | | |
|---|---|---|---|
| 2,914,918 | 12/1959 | Kaplan | 60/39.14 M |
| 2,939,654 | 6/1960 | Coanda | 244/23 C |
| 3,036,428 | 5/1962 | Chillson | 60/39.35 |
| 3,341,153 | 9/1967 | Fatouras | 244/52 |
| 4,023,751 | 5/1977 | Richard | 244/23 C |
| 4,062,185 | 12/1977 | Snow | 60/39.14 M |
| 4,110,975 | 9/1978 | Godtland | 60/39.35 |
| 4,241,576 | 12/1980 | Gertz | 60/39.34 |

FOREIGN PATENT DOCUMENTS 2445495 3/1975 Fed. Rep. of Germany ..... 244/12.2

Primary Examiner—Galen L. Barefoot
Attorney, Agent, or Firm—William C. Babcock

[57] ABSTRACT

A wingless aircraft that has a generally truncated cone fuselage that has a cockpit in the upper thereof in which the pilot sits, and a transparent rigid dome mounted on the upper portion of the fuselage that extends over the pilot. A number of equally spaced, elongate, jet engine assemblies are pivotally and adjustably supported within the fuselage, with each engine in communication with an air inlet defined in the fuselage. Each jet engine assembly includes a combustion chamber that has an elongate tubular nozzle extending downwardly therefrom, in which exhaust openings are defined through which the hot gaseous products of combustion discharge. The exhaust openings are elongate and substantially angularly disposed relative to the vertical, and as a result the exhaust gases not only rotate the nozzle but exert a reactive force sufficient to lift the fuselage to an airborne position. Rotation of the nozzles results in concurrent rotation of fans that compress air entering the intakes prior to it being discharged to the combustion chambers to mix with atomized fuel and burned to produce the gases of combustion. Guidance of the aircraft is achieved by angular movement of the rotating nozzles relative to the fuselage.

5 Claims, 10 Drawing Figures

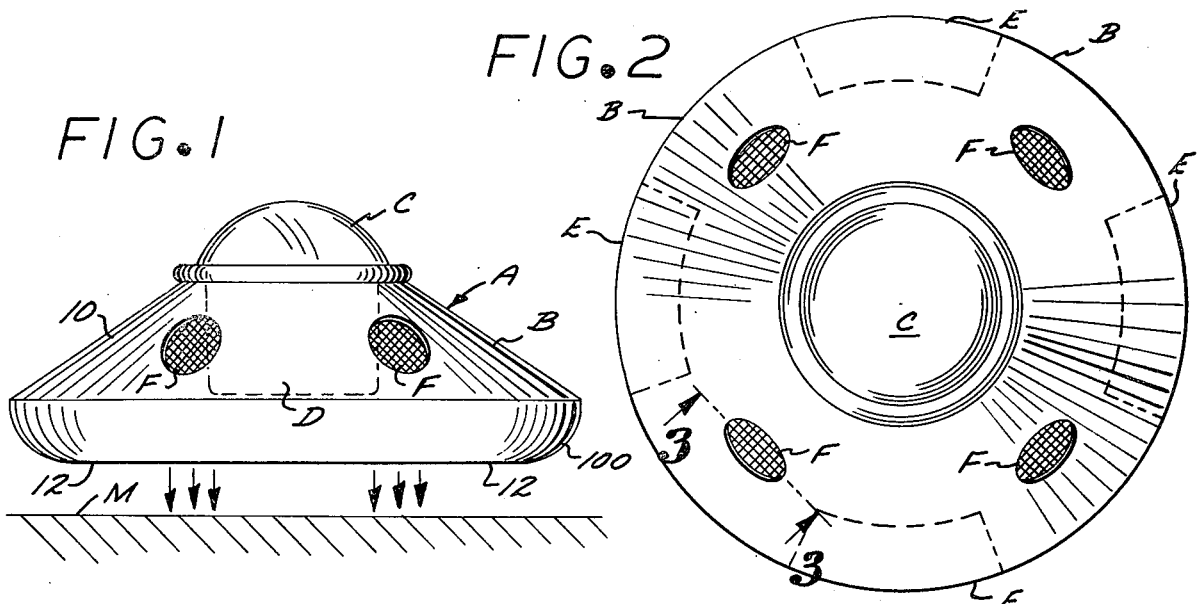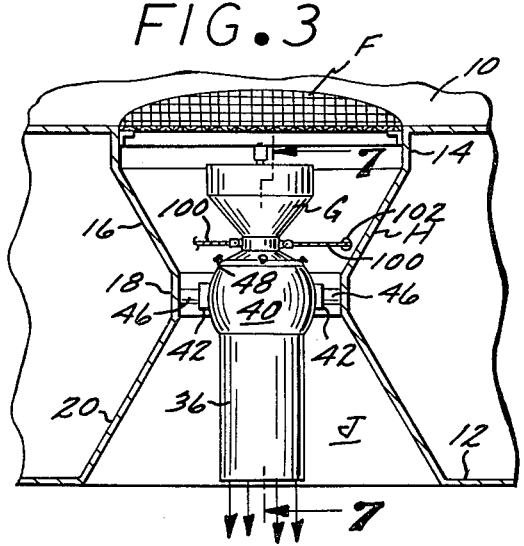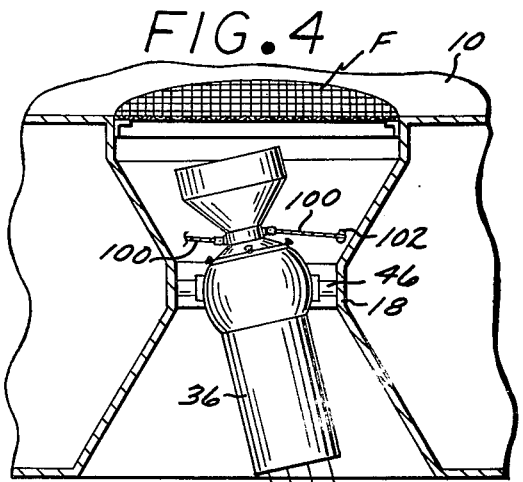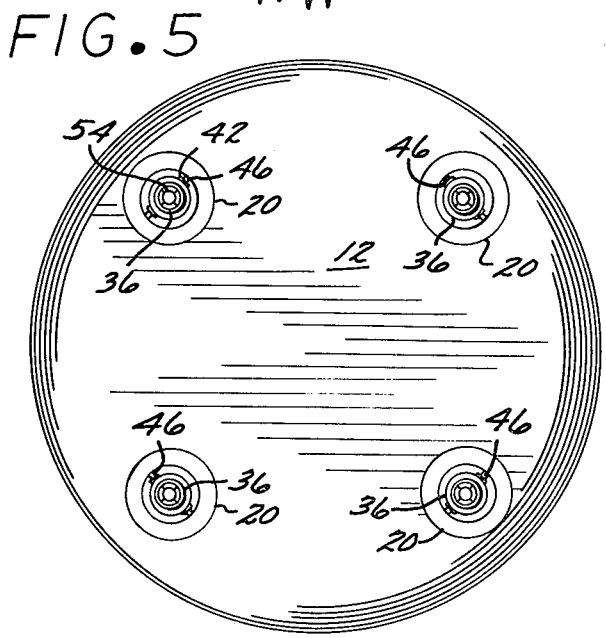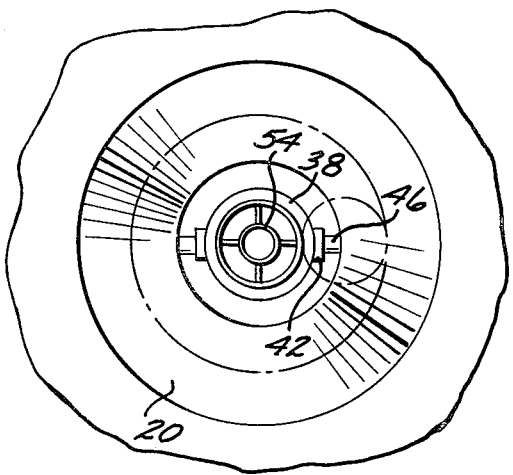

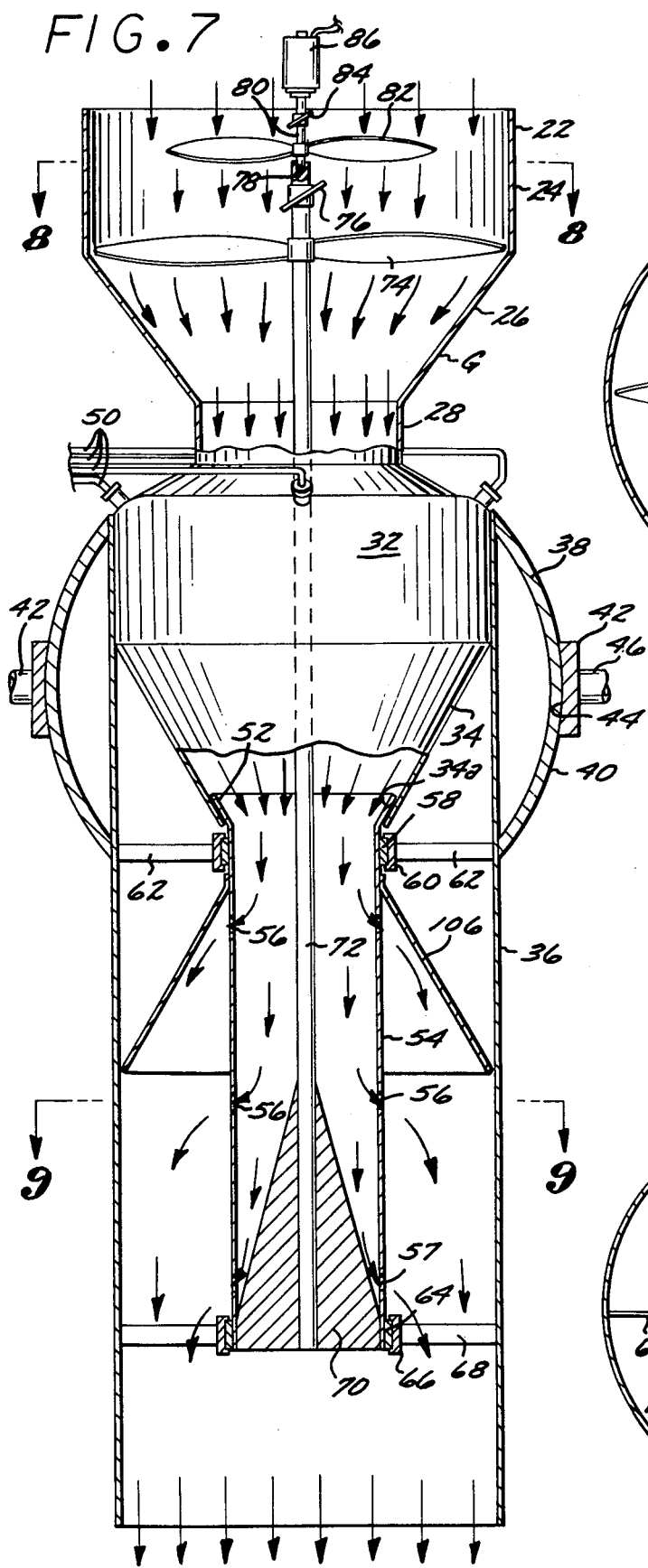
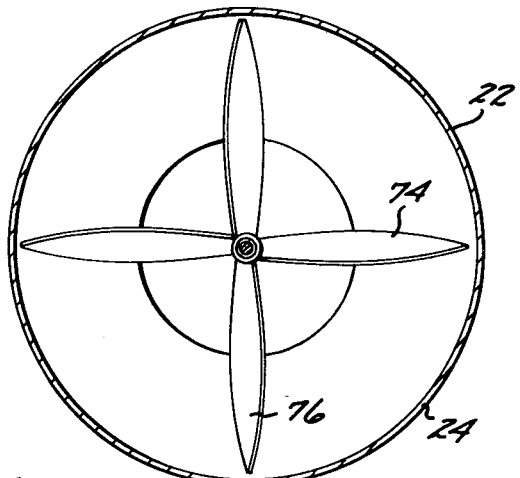
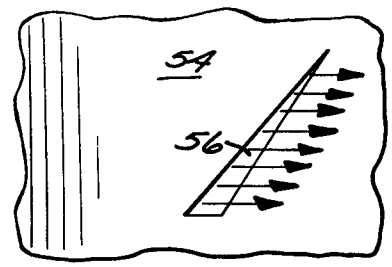
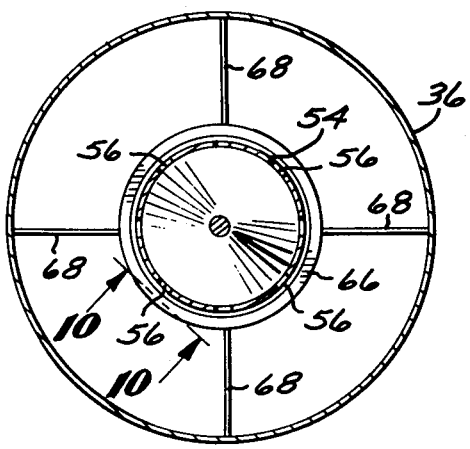

WINGLESS AIRCRAFT

DESCRIPTION OF THE PRIOR ART

In the past, numerous attempts have been made to devise a wingless aircraft, but such attempts have met with but limited success.

A major object of the present invention is to provide a wingless aircraft that has a cone shaped overall appearance, is powered by a number of internally positioned, pivotally and adjustably supported elongate jet engines that each has a rotatable downwardly extending nozzle, with exhaust from combustion of fuel not only causing rotation of the nozzles to drive fans to compress air prior to it entering the combustion chamber, but developing a thrust to maintain the aircraft airborne, and guidance of the aircraft being achieved by varying the angle of the nozzles relative the fuselage.

Another object of the invention is to overcome operational disadvantages of prior art wingless aircraft by providing one that is simple and easy to fly, has a simple mechanical structure, requires a minimum of maintenance attention, and when not in use may be stored in a relatively small confined space.

These and other objects of the invention will become apparent from the following description of a preferred form thereof.

SUMMARY OF THE INVENTION

The wingless, jet engine, propelled aircraft of the present invention has a generally conical shaped fuselage, which in the upper portion is defined by a upwardly convex transparent rigid shield that protects the pilot who is disposed directly there below, when in the aircraft. The fuselage at substantially mid point of the fuselage has a number of screened air intake openings defined therein, with each of the openings being in communication with a jet engine assembly that is pivotally supported within the fuselage, and the nozzle of each jet engine being disposed downwardly for gases of combustion that discharge from the nozzle to be directed downwardly to impart an upward force to the aircraft. Each of the jet engines includes first and second propellers disposed within a shroud that extends inwardly from one of the air intakes to communicate with a combustion chamber that has a number of fuel atomizing nozzles that are connected by conduits to one of a number of fuel tanks situated within the fuselage. The fuel-air mixture in the combustion chamber is initially ignited by spark plug of the like, with the mixture after initial ignition continuing to burn. Products of combustion resulting in the burning of the fuel are directed downwardly through a converging section to a tubular nozzle that is rotatably supported therefrom.

The combustion chamber and nozzle that is rotatably supported therefrom in a downwardly depending position are situated within the confines of a tubular housing, which housing on the upper end has a ring shaped member extending outwardly therefrom that has a circular transverse cross section. The circular member is pivotally supported by engagement by a rigid ring that has a transverse interior surface of circular transverse cross section and of substantially the same radius of curveture as the exterior surface of the convex ring secured to the tubular housing. The circular ring is supported by a spider that extends to a depth that is in communication with one of the air intakes, and extends downwardly to an opening formed in the bottom of the fuselage.

As the fuel-air mixture is burned within the combustion chamber, hot gases of combustion are generated therein and discharged downwardly through the nozzle to be emitted through a number of elongate discharge openings that are angularly disposed at a substantial angle relative to the bottom of the vehicle. The lower end of each nozzle is sealed by an upwardly extending member that has a shaft continuing upwardly therefrom to terminate in at least one set of propellers situated adjacent the air intake. As fuel is burned in the combustion chamber hot gases of combustion discharge downwardly through the openings in the nozzle to rotate the same, as well as the shaft and propeller and also to continue flowing downwardly through the tubular shell as a stream of gases at substantial velocity which imparts an upward thrust to the engine and the fuselage secured thereto. Rotation of the shaft and propeller previously described results in air flowing into the air intake being compressed to a substantial degree prior to entering the combustion chamber and burning in combination with the fuel that is discharged there into.

The invention includes a number of jet engine assemblies as above described, each of which is equally spaced from the other within the fuselage, and each of the jet engine assemblies being pivotally movable to direct the downward flow of gases of combustion therefrom, in guidance of the aircraft being achieved by varying the angulation of the jet engine containing shells relative to one another. As the angulation of the downwardly extending nozzles are varied, the direction of gases of combustion are flowing therefrom is changed, and as a result the direction of movement of the aircraft through the air may be controlled by the pilot varying the angulation of the jet engines in the tubular shells that enclose the rotating nozzles. Initiation of the operation of each of the jet engines above described is by an electric motor or other prime mover driving a propeller situated in one of the air intakes, to direct a downward flow of air through the combustion chamber and cooperate with fuel discharged thereinto to provide a stream of gases of combustion that flow downwardly through the rotating nozzle and shell. After the nozzle of each engine is rotating, the shaft associated with that nozzle is driving a first set of propellers, and the motor set of propellers is disconnected. Driving the first set of propellers results in an air stream being directed downwardly through the combustion chamber to mix with atomized fuel ejected thereinto, and the air-fuel mixture burning to provide the downwardly flowing stream of gases of combustion that result in rotation of the nozzle associated with that particular engine, and also due to the stream of gases discharging through one of the tubular shells effecting an upward lift on the fuselage to cause it to rise. After the fuselage is airborne, guidance of the fuselage is achieved by varying the angulation of the nozzles relative to the fuselage and to one another.

BRIEF DESCRIPTION OF THE DRAWINGS

FIG. 1 is a side elevational view of the wingless jet propelled aircraft;

FIG. 2 is a top plan view of the aircraft shown in FIG. 1;

FIG. 3 is a fragmentary vertical transverse cross sectional view taken on the line 3—3 of FIG. 2;

FIG. 4 is the same view as shown in FIG. 3 but with the jet engine assembly having been tilted to an angular position relative to the vehicle for guiding purposes;

FIG. 5 is a bottom plan view of the aircraft;

FIG. 6 is a bottom plan view of one of the jet engine assemblies and illustrating in phantom line the position to which the lower end of the nozzle may be manipulated by the pilot of the invention;

FIG. 7 is a vertical, enlarged, cross sectional view of one of the jet engine assemblies and movable support therefor taken on the line 7—7 of FIG. 5;

FIG. 8 is a transverse cross sectional view of the invention taken on the line 8—8, and illustrating two sets of propellers that are utilized in compressing air prior to the same being discharged into the combustion chamber of one of the engines;

FIG. 9 is a transverse cross sectional view of one of the engine assemblies, taken on the line 9—9 of FIG. 7;

FIG. 10 is a fragmentary enlarged side elevational view of one of the elongate upwardly and angularly disposed gaseous products of combustion openings formed in one of the nozzles and taken on the line 10—10 of FIG. 9.

DESCRIPTION OF THE PREFERRED EMBODIMENT

The wingless jet engine propelled aircraft A as may best be seen in FIG. 1 includes a generally frustoconical shaped fuselage B, that on the upper ends supports a transparent protective rigid dome C, and with a cockpit D situated therebelow in which the pilot (not shown) is seated. The aircraft A is illustrated as including four fuel tanks E as may be seen in FIG. 2 that are situated within the confines of the fuselage and equally spaced from one another. The fuselage B has four intakes F formed therein, with four jet engine assemblies G of elongate shape being disposed within the fuselage B and in communication with the air intakes F. Each of the jet engine assemblies G which is of elongate shape as may be seen in FIG. 3 is situated in a downwardly extending shroud H that has the upper end secured to the sheet material 10 defining the fuselage B. The shell 10 develops on the lower end into a convex portion 10a that merges into a flat bottom 12, as shown in FIG. 1. Each shroud as may best be seen in FIG. 3 includes a cylindrical member 14 secured to the shell 10, and extending downwardly therefrom, which cylindrical member develops into a converging section 16 of circular transverse cross section.

Each of the converging sections 16 on the lower end develops into a ring 18, which ring on the lower end develops into a diverging section 20 of circular transverse cross section that merges into the bottom 12.

Each shroud H defines an interior confines space J that is open at the bottom as shown in FIG. 3. In FIG. 3 it will be seen that each shroud H includes a cylindrical member 14 secured to the shell 10, with the cylindrical member 14 on the lower end merging into a converging section 16. Each section 16 on the lower end develops into a ring 18, from which a diverging section 20 extend downwardly to merge into the bottom 12.

Each of the jet engines G as may best be seen in FIG. 7 includes an air intake portion 22 that is partially defined by a first cylindrical shell 24, that on the lower end thereof develops into a converging section 26. The section 26 on the lower end merges into the upper end of a second cylindrical shell 28. The shell 28 on the lower end develops into a downwardly and outwardly converging section 30 that has the outer end thereof in communication and secured to the upper outer portion of a cylindrical combustion chamber 32. The combustion chamber 32 on the lower end develops to an inwardly converging section 34 that has a lower tapered opening 34a defines therein.

A tubular shell 36 is provided for each of the jet engines G as may be seen in FIG. 7, with the shell being secured by conventional means to the exterior surface of the combustion chamber 32.

A first ring shaped member 38 is secured to the upper exterior portion of the shell 36, with the ring 38 having an exterior surface of 40 of circular cross section. A second ring 42 of substantially less width than that of the first ring 38 is provided, which second ring has an interior convex surface 44 that is of circular shape and slidably engages the surface 40 to permit the first ring 38 to pivot relative to the second ring 42. The second ring 42 is supported by a spider 46 from the ring 18 as may be seen in FIG. 3.

In FIG. 7 it will be seen that a number of fuel injecting nozzles 48 are provided that discharge fuel into the interior of the combustion chamber 32, which fuel is delivered to the nozzles from conduits 50 that extend to one of the tanks E in which the fuel is pressurized. The opening 34a rotatably engages the flared upper end 52 of a cylindrical nozzle 54 that extends downwardly in the tubular shell 36 and is concentrically disposed therein. The cylindrical nozzle 54 has a number of longitudinally and circumferentially spaced discharge openings 56 formed therein as may be seen in FIG. 10, each of the openings being of triangular configuration and extending upwardly relative to the bottom 12 at a substantial angle. A collar 58 is secured to the exterior surface of the tubular nozzle 54 adjacent the upper outwardly flared end 52 thereof. The collar 58 is rotatably supported in a ring shaped recessed bearing 60, which bearing is supported in a fixed position relative to the tubular shell 56 by a first spider 62. Each cylindrical nozzle 54 on the lower end thereof has a second collar 64 secured thereto that is rotatably supported in a second bearing 66. The bearing 66 is maintained at a fixed position relative to the tubular shell 36 by a second spider 68.

Each tubular nozzle 54 is illustrated as in FIG. 7 as including an elongate plug 70 of generally triangular vertical transverse cross section, which plug has a shaft 72 extending upwardly therefrom into the air intake portion 22. The shaft 72 on the upper end thereof supports a first and second propeller 74 and 76 that are preferably vertically spaced from one another. The upper end of the shaft 72 has a recess 78 formed therein that is rotatably engaged by a second shaft 80. The recess 78 is engaged by a shaft 80 that supports third and fourth propellers 82 and 84. The shaft 80 and the propellers 82 and 84 may initially be driven by an electric motor 86 or like prime mover to initiate operation of the jet engine assembly G with which it is associated. The combustion chamber 32 has a fuel-air mixture igniting device 86 mounted thereon, which is used only in the starting of the jet engine assembly.

In operation, each of the jet engines G is initially actuated by causing the electric motor 86 to rotate the third and fourth propellers 82 and 84 to direct a current of air downwardly through the combustion chamber 32. Concurrently, fuel is delivered through the conduits 50 to the atomizing nozzles 48, where a fuel-air mixture is formed in the combustion chamber 32. The fuel igniting device 86 which may be a spark plug or the like causes the fuel-air mixture to ignite, with hot gases of combustion being directed downwardly through the nozzle 54 to discharge tangentially through the openings 56, and in so doing causing rotation of the nozzle 54 together with the shaft 72. Rotation of the shaft 72 results in rotation of the first and second propellers 74 and 76 to draw air into the intake 22 and compress the same as the air is directed downwardly into the combustion chamber 32. The air flowing downwardly is mixed with the fuel to form a combustable mixture, which burns and with the hot gases of combustion flowing downwardly through the nozzle 54 to cause the same to rotate as it discharges through the openings 56. The hot gases of combustion after discharging through the openings 56 flow downwardly through the shell 36 in the direction of the arrows shown in FIG. 7 in the lower portion thereof, and these discharging gases imparting an upward force to the aircraft A to cause the same to lift from the ground surface M. After each engine is in operation as above described, the motor 86 is no longer supplied with current through the conductors 87, and accordingly no longer drives the third and fourth propellers 82 and 84.

Each of the jet engine assemblies G may be pivotally moved by pairs of cables 100 that are secured thereto above combustion chamber 32, with the cables extending through openings 102 in the shroud H associated with that engine to the cockpit where they are secured to manually movable members or other conventional control devices (not shown) that may be manipulated by the pilot. Each jet engine has a cone shaped deflector 106 secured to the nozzle 54 thereof as shown in FIG. 7 to direct the jet of hot gases of combustion downwardly in the tubular shell 36 associated therewith.

The construction and operation of the wingless aircraft A has been described previously in detail and need not be repeated.

What is claimed is:

1. A wingless aircraft that includes:
   a. a truncated cone shaped fuselage assembly that includes a bottom that has a plurality of circumferentially spaced openings therein, a side wall that tapers upwardly and inwardly from said bottom; a convex transparent dome removably secured to the upper portion of said side wall; a cockpit for a pilot situated in said fuselage below said dome; a plurality of circumferentially spaced fuel tanks disposed within said fuselage, a plurality of air intake openings in said side wall, and a plurality of tubular shrouds disposed within said fuselage each of said shrouds communicating with one of said air intake openings and one of said openings in said bottom, each of said shrouds defining a compartment isolated from the balance thereof;
   b. a plurality of elongate jet engine assemblies, each of said jet engine assemblies including an air intake, a combustion chamber and a nozzle for hot gases of combustion that extend from said combustion chamber in a direction opposite from that of said air intake, each of said nozzles being an elongate tubular member having a lower end, and a plurality of elongate upwardly extending openings in each of said nozzles through which pressurized gases of combustion from the burning of said air and fuel discharge tangentially;
   c. first means for pivotally supporting each of said jet engine assemblies in one of said compartments, with said nozzle and said jet engine extending downwardly;
   d. second means for supplying atomized fuel from said fuel tanks to said combustion chambers;
   e. third means for compressing air from said air intake openings prior to it discharging into said air intakes of said jet engines;
   f. fourth means for initiating burning of said atomized fuel and compressed air in said combustion chambers to develop a plurality of thrusts through said nozzles that will lift said aircraft from the ground;
   g. fifth means for rotatably supporting said nozzles from said combustion chambers;
   h. a plurality of cylindrical shells disposed within said shrouds that extend around said nozzles and are secured to said engine assemblies;
   i. a plurality of deflectors disposed in said cylindrical shells above said openings, said deflectors serving to direct hot gases of combustion discharging from said openings in said nozzles downwardly to exert an upward thrust on said aircraft to dispose the latter in an airborne position, said gases of combustion as they discharge tangentially through said openings in said nozzles causing the latter to rotate;
   j. a plurality of plugs that close the lower ends of said nozzles and are rigidly secured thereto;
   k. a plurality of shafts that extend upwardly from said plugs through said combustion chambers to positions adjacent said air intakes;
   l. sixth means rotated by said shafts for compressing air entering said air intakes from said air intake openings prior to said air entering said combustion chambers; and
   m. seventh means manually actuatable from said cockpit for pivoting said jet engine assemblies after said aircraft is airborne to so dispose the direction of thrust of said gases of combustion from said nozzles as to guide said aircraft when the latter is airborne.

2. An aircraft as defined in claim 1, in which said sixth means are propellers mounted in said air intakes of said jet engine assemblies and driven by said rotation of said plugs and nozzles.

3. An aircraft as defined in claim 2, which in addition includes:
   eighth means for discharging current of air downwardly through said combustion chambers to initially start combustion of fuel and air therein.

4. An aircraft as defined in claim 3, in which said eighth means includes:
   a plurality of prime movers mounted in intermediate positions between said air intake openings and said air intakes; and
   a plurality of second propellers situated above said first propellers that are initially driven by said prime movers.

5. An aircraft as defined in claim 4, in which said prime movers are electric motors.

* * * * *